United States Patent [19]

Basso et al.

[11] Patent Number: 5,787,071
[45] Date of Patent: Jul. 28, 1998

[54] HOP-BY-HOP FLOW CONTROL IN AN ATM NETWORK

[75] Inventors: Claude Basso, Nice; Jean Calvignac, La Gaude; Daniel Orsatti, Cognos sur Mor; Fabrice Verplanken, La Gaude, all of France

[73] Assignee: International Business Machines, Armonk, N.Y.

[21] Appl. No.: 554,113

[22] Filed: Nov. 6, 1995

[30] Foreign Application Priority Data

Nov. 8, 1994 [EP] European Pat. Off. .......... 94 480125.7

[51] Int. Cl.⁶ .................................................. H04L 12/56
[52] U.S. Cl. ........................ 370/231; 370/232; 370/236
[58] Field of Search ................................ 370/229, 230, 370/231, 232, 234, 235, 236, 253, 412, 417, 468

[56] References Cited

U.S. PATENT DOCUMENTS

| 5,453,981 | 9/1995 | Katsube et al. | 370/231 |
| 5,455,826 | 10/1995 | Özveren et al. | 370/232 |
| 5,633,861 | 5/1997 | Hanson et al. | 370/232 |

FOREIGN PATENT DOCUMENTS 0573739  12/1993  European Pat. Off. .

OTHER PUBLICATIONS

International Switching Symposium 1992, vol. 1 of 2, 25 Oct. 1992 Yokohama pp. 229–233, XP 000337649 H.J. Chao 'A General Architecture for Link–Layer Congestion Control in ATM Networks'.

IEEE Network: The magazine of Computer Communications, vol. 2, No. 1, Jan. 1988 New York US pp. 72–76 M. Gerla L. Kleinrock 'Congestion Control in Interconnected LANs', p. 73.

*Primary Examiner*—Benedict V. Safourek
*Attorney, Agent, or Firm*—Gerald R. Woods

[57] ABSTRACT

A communication system comprises a plurality of nodes interconnected by links comprising a plurality of connections. The traffic between the nodes is set up by a reserved bandwidth service and/or a non reserved bandwidth service. The non reserved bandwidth service is controlled by a hop by hop backpressure mechanism. When the traffic entering a node exceeds a high threshold, the backpressure mechanism generates stop backpressure primitives in order to throttle the entering traffic. In case of congestion the mechanism is either able to selectively interuppt the connection contributing to the congestion without affecting the rest of the link traffic, or to globally stop all link traffic. Traffic can be resumed if traffic rates fall below the low threshold values.

9 Claims, 9 Drawing Sheets

GENERAL RULE OF THRESHOLD ADJUSTMENT

| NUMBER OF QUEUES | UP THRESHOLD | DOWN THRESHOLD |
|---|---|---|
| 1 - 2 | IBB/2 CELLS | IBB/4 CELLS |
| 3 - 4 | IBB/4 CELLS | IBB/8 CELLS |
| 5 - 8 | IBB/8 CELLS | IBB/16 CELLS |
| 9 - 16 | IBB/16 CELLS | IBB/32 CELLS |
| 17 - 32 | IBB/32 CELLS | IBB/64 CELLS |
| ABOVE 32 | IBB/32 CELLS | IBB/64 CELLS |

RES : RESERVED

HOP-BY-HOP FLOW CONTROL IN AN ATM NETWORK

FIELD OF THE INVENTION

This invention relates in general to a networking communication system and more particularly to a flow control mechanism for providing best effort service in a high speed ATM network.

BACKGROUND ART

Asynchronous Transfer Mode (ATM) technology is expected to become the base technology for the next generation of high speed networks. High speed networks support diverse applications with different traffic and Quality Of Service (QOS) requirements. Different kinds of applications require different control flow strategies. Some applications, like multimedia and time critical data applications, require guaranteed limits on transmission delays and guaranteed throughput but can tolerate some loss of data. Other applications can tolerate variations in delay and throughput but are very loss sensitive.

In ATM reserved bandwidth (RB) service, a user must establish a traffic contract with the network at call set-up before transmitting data (see FIG. 1). The contract includes specification of a desired QOS class and a set of traffic descriptors. The network either refuses the call or, through resource allocation, provides the desired QOS for the ATM connection. The allocated bandwidth between a source and a destination may be less than the anticipated peak bandwidth rate in order to benefit from statistical multiplexing gains..

In a LAN environment, data sources are bursty and unpredictable. Traffic rates, over time, can vary by several orders of magnitude. For such unpredictable sources, the anticipated peak rate for a connection could be allocated at call set-up in order to avoid heavy data losses inside the network. However, the network would be inefficiently utilized since bandwidth reserved for a particular connection could not be made available to other connections regardless of whether it was needed by the reserving connection.

One way to increase network link utilization is through the addition of a non reserved bandwidth (NRB) service class, also called best effort (BE) service (see FIG. 2). In this service class, no bandwidth is reserved and sources transmit on a best effort basis, grabbing as much of the available bandwidth as they can, without affecting RB traffic for which bandwidth has been reserved. With no resources being allocated in advance, NRB service requires a flow control mechanism in order to control the sources. The first objective of such a flow control mechanism is to avoid congestion in the network; the second objective is to balance the available, unreserved bandwidth among the different sources.

A backpressure concept, which is one form of flow control, has been extensively studied and is already implemented. The objective of backpressure flow control is to stop incoming traffic at a congested node of the network before losses occur. Information is carried by a backpressure signal which stops or starts the traffic coming from the upstream nodes in the network. In this scheme, every source is supposed to be able to stop or restart its NRB traffic when receiving an appropriate backpressure signal. The backpressure concept is described by T. L. Rodeheffer in "Experience with Autonet", *Computers Networks and ISDN Systems*, vol. 25,1993, p. 623–629.

The drawback of simple backpressure mechanisms, such as the one described in the above mentioned document, is that they are unable to provide fairness. If congestion occurs at a particular node, that node will send backpressure signals to all of its upstream nodes and will block connections indifferently whether or not such connections are actually contributing to the congestion. To provide fairness, a backpressure mechanisim must be selective and must operate only on those connections that are contributing to congestion.

A selective congestion control mechanism is described by B. J. Vickers and T. Suda in 'Connectionless Service for Public ATM Networks', *IEEE Communications* Magazine, August 1994. p. 34–42. A scheme through which best effort service may be provided in ATM networks using hop by hop flow control is suggested. A hop is well known in the prior art (see FIG. 3) and can be defined as a standard interface between two nodes or systems. Examples of standard interfaces are: a User to Network Interface (UNI); a Network to Network Interface (NNI); or a Private Network to Network Interface (P_NNI). One of the drawbacks of the mechanism described in the referenced document is that when a node has to throttle the traffic of a link having a great number of connections, it has to do it one connection at a time. Because data will already be in flight (being transmitted over a connection) when a backpressure signal is generated, the number of ATM cells which have to be received into buffers after the backpressure signal has been sent but before the traffic actually stops, can be very large. In order to guarantee no traffic is lost, the required buffer space would become prohibitively large, which is incompatible with an efficient hardware implementation.

SUMMARY OF THE INVENTION

Accordingly, an object of the present invention is to provide a data traffic control system which can be fair and loss-free even with small buffer capacity. To attain this object, there is provided, according to the present invention, a traffic control system for controlling traffic in a communication system having a plurality of nodes interconnected by links. Each link supports a plurality of connections which are established either by reserved bandwidth service or best effort service. The best effort service is supported by both a per connection backpressure mechanism and a global backpressure mechanism. The backpressure mechanism encompasses two primitives, a selective backpressure primitive which allows any node to control one connection, and a global backpressure primitive which, in case of global congestion, allows any node to control one link without having to send as many selective backpressure primitives as there are best effort connections.

Each node has a buffer for storing a queue for each NRB connection. A connection is considered to be active if there is at least one traffic cell stored in its attached queue. The backpressure primitives are generated by a node when the traffic entering the node exceeds predetermined global and selective thresholds. These selective thresholds are dynamically adjusted according to the number of active connections to upstream nodes.

A further object of this invention is to provide an efficient traffic control apparatus, in which traffic control information is never blocked on a congested link or connection. Bandwidth is reserved in the RB service for the traffic control information used to control best effort service. A further object of this invention is to provide a traffic control system which generates reduced traffic control by embedding one to twelve selective control information units and one global control information unit in each traffic control cell.

BRIEF DESCRIPTION OF THE DRAWINGS

The above object and features of the present invention will be more apparent from the following description when read with reference to the accompanying drawings, wherein.

DETAILED DESCRIPTION OF THE PREFERRED EMBODIMENT

Figure 1:
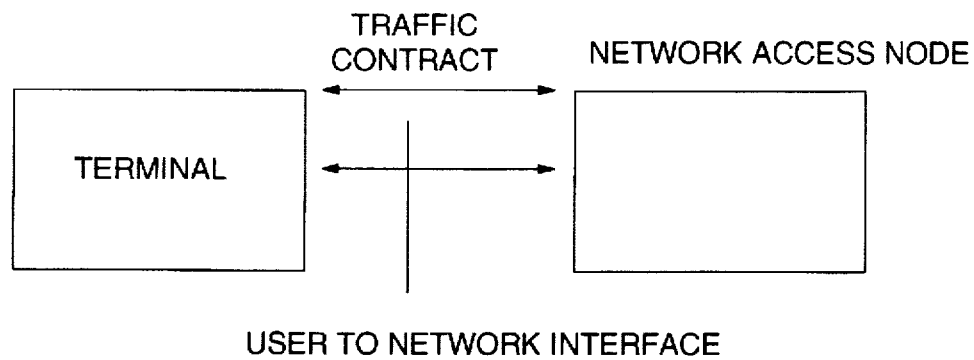
FIG. 1 is a diagram of a conventional reserved bandwidth (RB) service.
Figure 2:
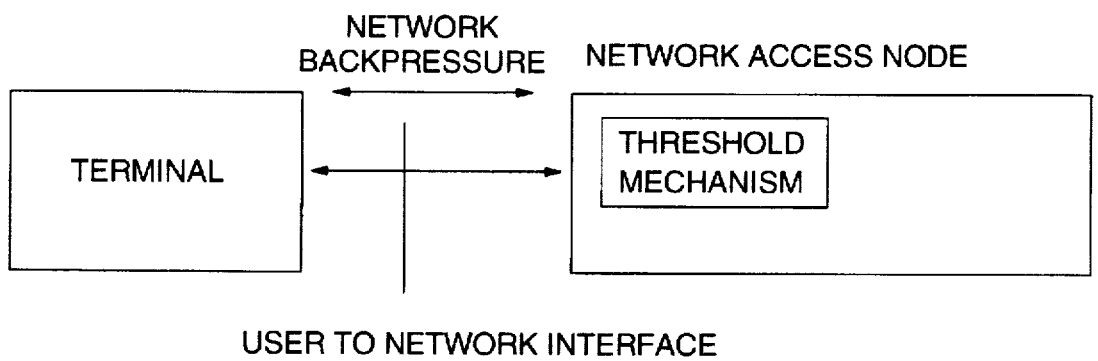
FIG. 2 is a diagram of a conventional non reserved bandwidth (NRB) service.
Figure 3:
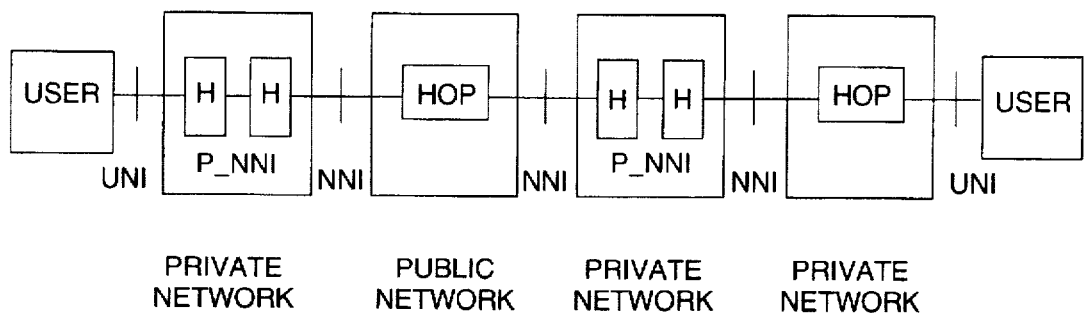
FIG. 3 is a diagram of a network comprising a plurality of nodes.
Figure 4:
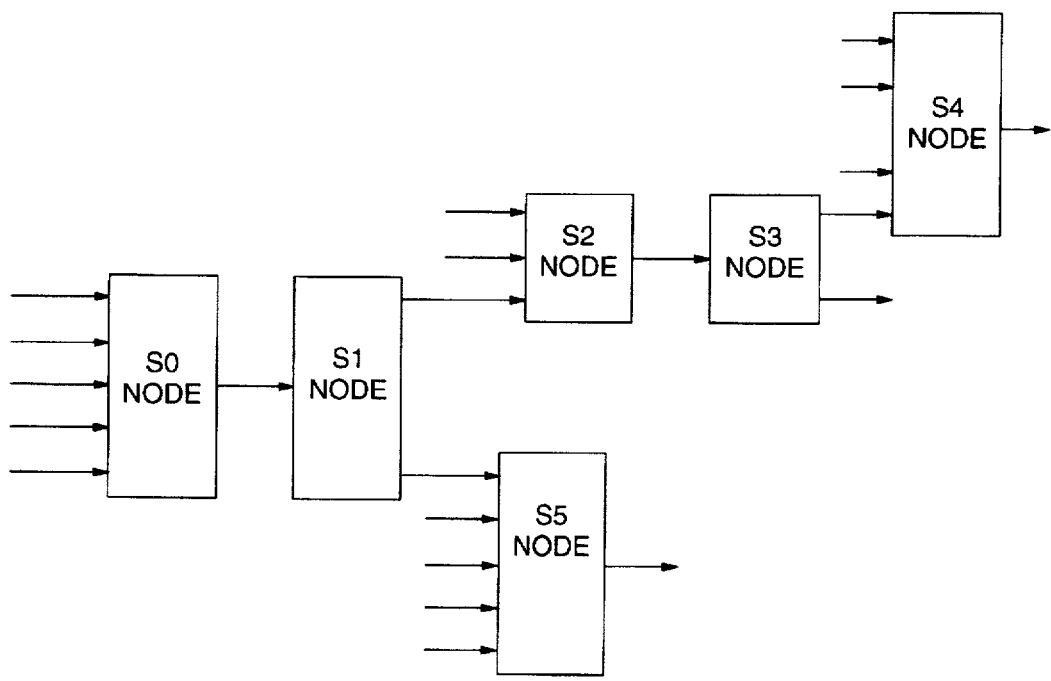
FIG. 4 is a general view of a six node configuration.

FIG. 4 shows a six node network configuration in which hop by hop flow control is implemented. Each one of the nodes S0, S1 . . . S5 can receive flow control information from the nodes to which it sends data traffic. Nodes to which data traffic is sent are characterized as being downstream relative to the sending node. Nodes from which data traffic are received are characterized as being upstream of the receiving node. For example if S1 is considered the reference node, S0 is the upstream node of S1, and S2 and S5 are downstream nodes of S1.

Figure 5:
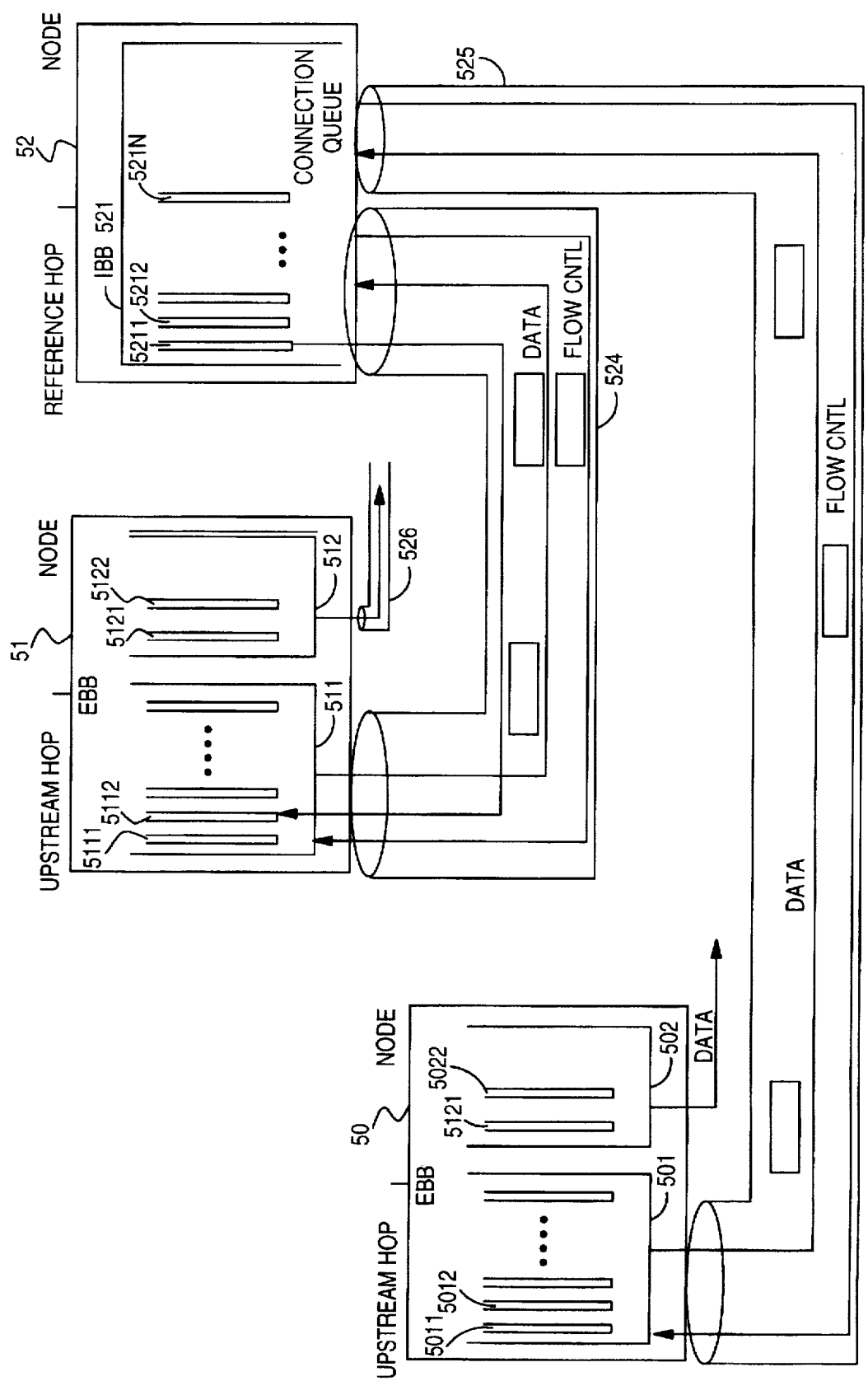
FIG. 5 is a detailed view of a hop by hop flow control implementation in accordance with a preferred embodiment of this invention.

FIG. 5 is a detailed view of three nodes, showing in a generic way how three interconnected nodes 50, 51 and 52 function together. Only the data traffic flowing from nodes 50 and 51 to node 52 and the control traffic flowing from node 52 to nodes 50 and 51 are shown. But as ATM is full duplex, the reverse paths (data traffic flowing from node 52 to nodes 50 and 51 and associated flow control traffic) also exist even if not shown. In a preferred embodiment of this invention a connection is defined as a switch virtual circuit in an ATM virtual circuit service but can also be defined as a virtual circuit in an ATM virtual path service or as a pair of Medium Access Control (MAC) addresses (MAC source address, MAC target address) in an ATM local area network emulation service.

Each node has at its ingress an input buffer, such as IBB 521, dedicated to best effort traffic, and at its egress an output buffer, such as one of buffers 501, 502, 511, 512, for each output port Pj dedicated to best effort traffic such as EBB (Pj). Nodes 50, 51 and 52 are interconnected through a UNI or NNI interface. Data cells received by node 52 are queued in buffers providing a separate queue 5211 and 5212 for each connection established among the three nodes. The three node system is shown only as an example. In a more complex system, up to n queues would be provided where n is the number of possible connections between two nodes in the system.

Flow control information can apply either for a best effort connection of a particular upstream node or to the aggregate of best effort connections of all upstream nodes. Node 52 can receive data from several upstream queues, 5011 and 5012 from buffer 501 and 5111 and 5112 from buffer 511. Flow control information for a single connection (selective backpressure) will be issued to the corresponding buffer whereas flow control information applying to the entire best effort traffic (global backpressure) will be sent to each upstream node feeding the node from which the flow control information is distributed. In the case of flow control information applying to a single best effort connection (selective backpressure), only this connection will be throttled. For example, if queue 5211 exceeds a selective threshold of node 52, a selective stop backpressure signal is sent on link 524 and the node 51 will stop scheduling transmissions from queue 5112 after receiving the selective backpressure information.

In the case of flow control information applicable to the aggregate of best effort traffic (global backpressure), all best effort traffic transmitted between concerned nodes will be throttled. For example, if buffer 521 exceeds the global threshold of node 52, a global stop backpressure signal is sent to the other nodes on links 524 and 525. The node 50 will stop scheduling all transmissions from buffer 501 when receiving the global backpressure signal, but buffer 502 may continue to transmit on connections to nodes other than node 52. The node 51 will stop scheduling all transmissions from buffer 511 when receiving the global backpressure information, but buffer 512 may continue to transmit to other nodes (not shown).

Figure 6:
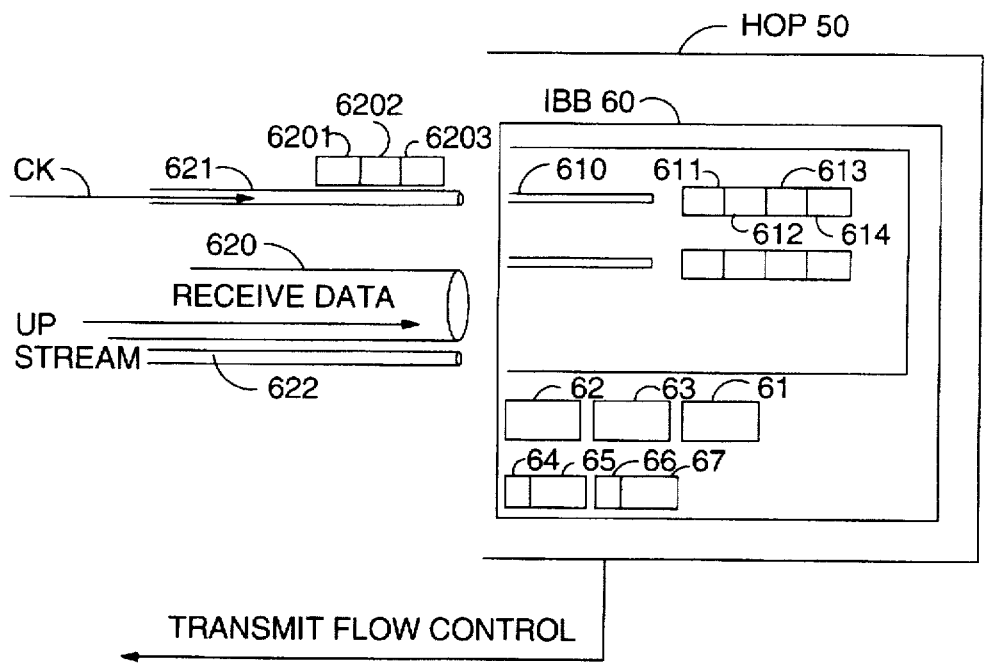
FIG. 6 is a diagram of a node input buffer structure.

FIG. 6 depicts a node input buffer structure and the data flow and control flow received and transmitted for a representative node in the network. Flow control is transmitted from the buffer to the appropriate upstream node and is triggered by the various up and down thresholds 64, 65, 66 and 67 provided by the queuing scheme. There is a high global threshold 64, a low global threshold 65, a high selective threshold 66 and a low selective threshold 67 for each IBB. A GBPX bit 61 indicates whether links entering IBB 60 are subject to global backpressure. A counter 62 tracks the number of active connections NAC in said IBB while a counter 63 tracks the total number of cells queued in the different queues of the IBB. A counter 611 is associated with queue 610 for counting the number of cells stored in the queue. CBPX bit 612 indicates whether the specific connection 610 is selectively backpressured and counter 613 CBPXCNT represent the number of cells received by connection 610 after a backpressure signal was sent to a cell source. SD bit 614 indicates whether the cells conveyed by said connection 610 are to be discarded or not. Indicating means 6201, 6202, 6203. 6201 are associated with link 620 entering IBB 60 and represent the latency of the link. Latency is defined later in the present description. Counter 6202 represents the total number of cells stored in the different queues corresponding to link 620 if a global backpressure signal was sent for the entire link. A PD bit 6203 indicates whether cells conveyed by said link are to be discarded or not.

Figure 7:
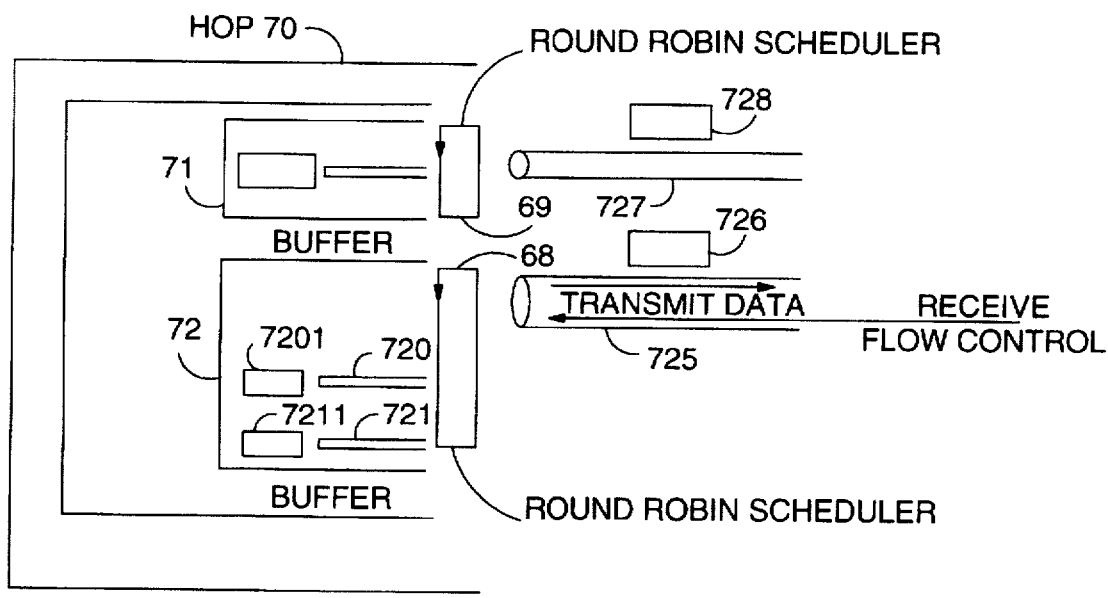
FIG. 7 is a diagram of a node output buffer structure.

FIG. 7 depicts a node output buffer structure and the data flow and control flow received and transmitted. There is one output buffer for best effort service EBB 71, 72 for each outgoing link 727, 725. Flow control signals are received from a downstream node and trigger actions in the round robin schedulers 68 and 69. When a connection supplying cells to queue 721 is selectively backpressured by a downstream node, the associated connection backpressured bit CBPR 7211 is set to one and the queue 721 is removed from the round robin scheduler. When a link 725 is globally backpressured by a downstream node, the associated global backpressure bit GBPR 726 is set to one and the round robin scheduler 68 associated with said link 726 is inhibited.

Figure 8:
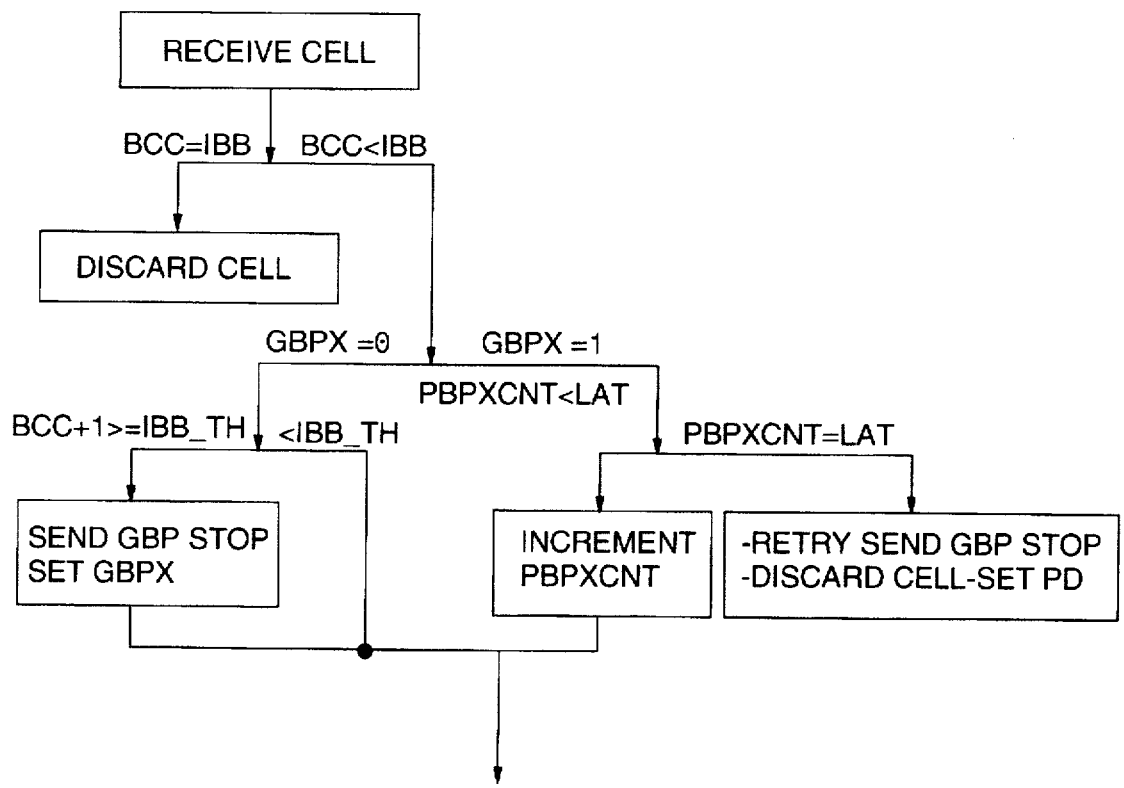
FIG. 8 is a flow diagram of global stop backpressure generation.
Figure 9:
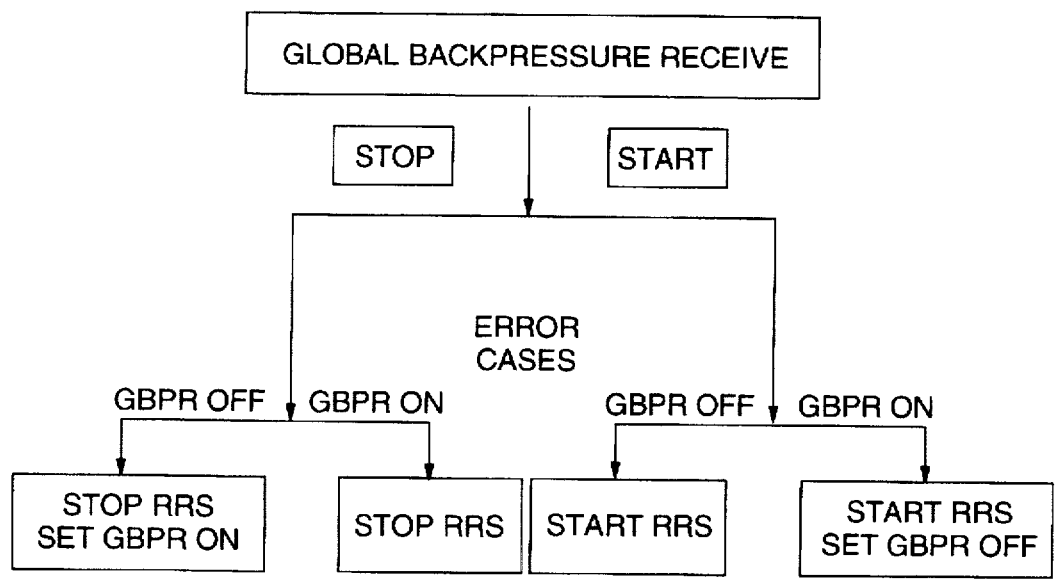
FIG. 9 is a flow diagram of global stop/start backpressure reception.

FIG. 8 is a flow diagram of global stop backpressure generation and FIG. 9 is a flow diagram of a global stop/start backpressure reception. Global stop handling will now be explained with reference to FIGS. 6 through 9. When a cell is received in the IBB 60 of a node 50, from a port Pi, if the number of cells 63 stored in the IBB 60 is equal to the IBB global high threshold value 64 (IBB_Th) and if the upstream nodes entering said node are not already backpressured (GBPX bit 61 to 0) then, node 50 sends backwards on every input port Pi a global backpressure message with the information 'global stop' and sets the GBPX bit to 1.

As shown in FIG. 9, the upstream node receiving a 'global stop' signal will stop scheduling cells out of its EBB(Pi) until it receives a 'global start' information. The global stop is accomplished by inhibiting the round robin scheduler 68. Since it takes a finite amount of time for a global stop signal to reach the upstream node, the upstream node may have causes some cells to be transmitted to the referenced node after the global stop signal is generated. The extra cells will normally be received in the downstream node. The reference node 50, which is the node sending the backpressure signal, increments the PBPXCNT counter of port Pi when receiving extra cells from said port Pi. The latency value of a link is the number of cells queued in the buffer of a node during a round trip delay of a cell between said node and an upstream node at the extremity of said link. When the PBPXCNT counter reaches a link latency value LAT, the reference node sets the port discard bit (PD) of said link, discards the cell and retransmits the global stop backpressure information. Every incoming cell from the link will be discarded until the port discard bit of said link is reset. Instead of discarding the incoming cells, an alternative when the PBPXCNT counter reaches the LAT value is to tag and accept said cells and to discard them later if severe congestion occurs. For the setting of the latency value, a safety margin may be added to the round trip delay in order to take into account the time necessary for processing the backpressure information in the upstream node.

Figure 10:
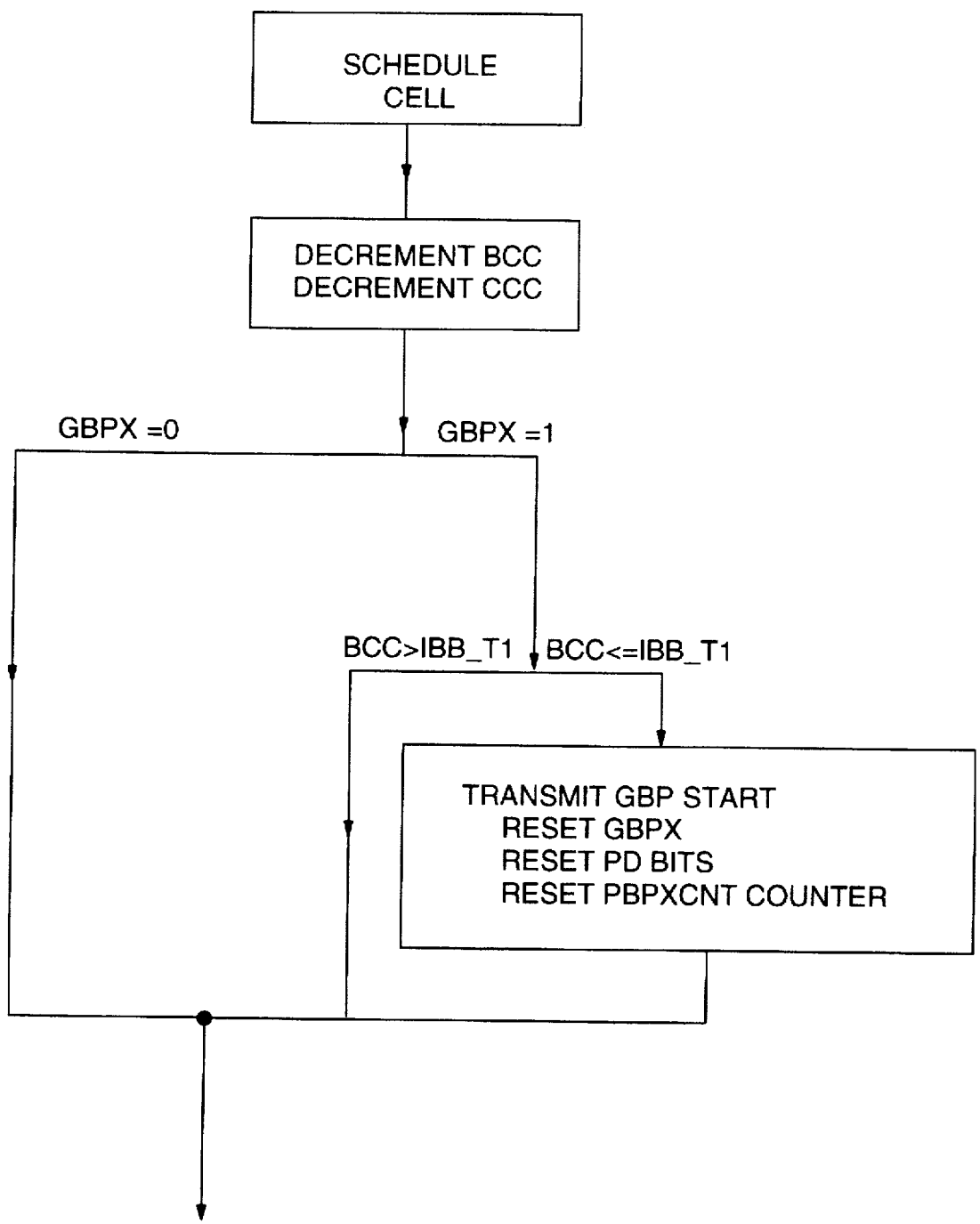
FIG. 10 is a flow diagram of global start backpressure generation.

FIG. 10 is a flow diagram of global start backpressure generation. Global start handling will now be explained with reference to FIGS. 6 through 9. When a cell is transmitted from the IBB 60 of a node 50, if the number of cells 63 stored in the IBB 60 is equal to the IBB low global threshold 65 (IBB_Tl) and if the upstream nodes supplying cells to node 50 are backpressured (bit GBPX=1), then the node 50 sends a global backpressure signal with the information 'global start' to all upstream nodes, resets the PD bits, the PBPXCNT counters and the GBPX bit. As described with reference to FIG. 9, each upstream node will resume scheduling transmission of cells out of its EBB(Pi), where Pi is the port connected to the reference node. This is done by restarting the round robin scheduler. Selectively backpressured connections, the queues for which are handled by the round robin scheduler, are not affected by the restart.

Two points need to be considered when defining the global thresholds for the buffer of a node. The first point deals with the high global threshold of the node. In order to ensure a loss-free operation, the threshold must be set up so that the extra buffer capacity above the threshold is greater than the aggregate latency of the upstream nodes connected to said node. The second point deals with the low global threshold of the node. The low global threshold must be high enough to ensure a no-underrun operation; that is, the extra buffer capacity below the low global threshold must be greater than the minimum latency or round trip delay of the upstream nodes of said node. That can be expressed as follows:

$$IBB\_Tl > Minimum(Latency)$$

However, a low global threshold value too close to the high one, would lead to numerous threshold crossings which in turn would lead to frequent generation of control signals. According to a preferred embodiment of this invention, the global low threshold value is defined as half the global high threshold value. That meets the no-underrun condition and represents an acceptable tradeoff between traffic control overhead and traffic underun.

As shown in FIG. 6, two selective thresholds are defined in the IBB of a node. The high selective threshold 66 (IBB_STh) and the low selective threshold 67 (IBB_STl) are common to all active connections of the IBB.

Figure 11:
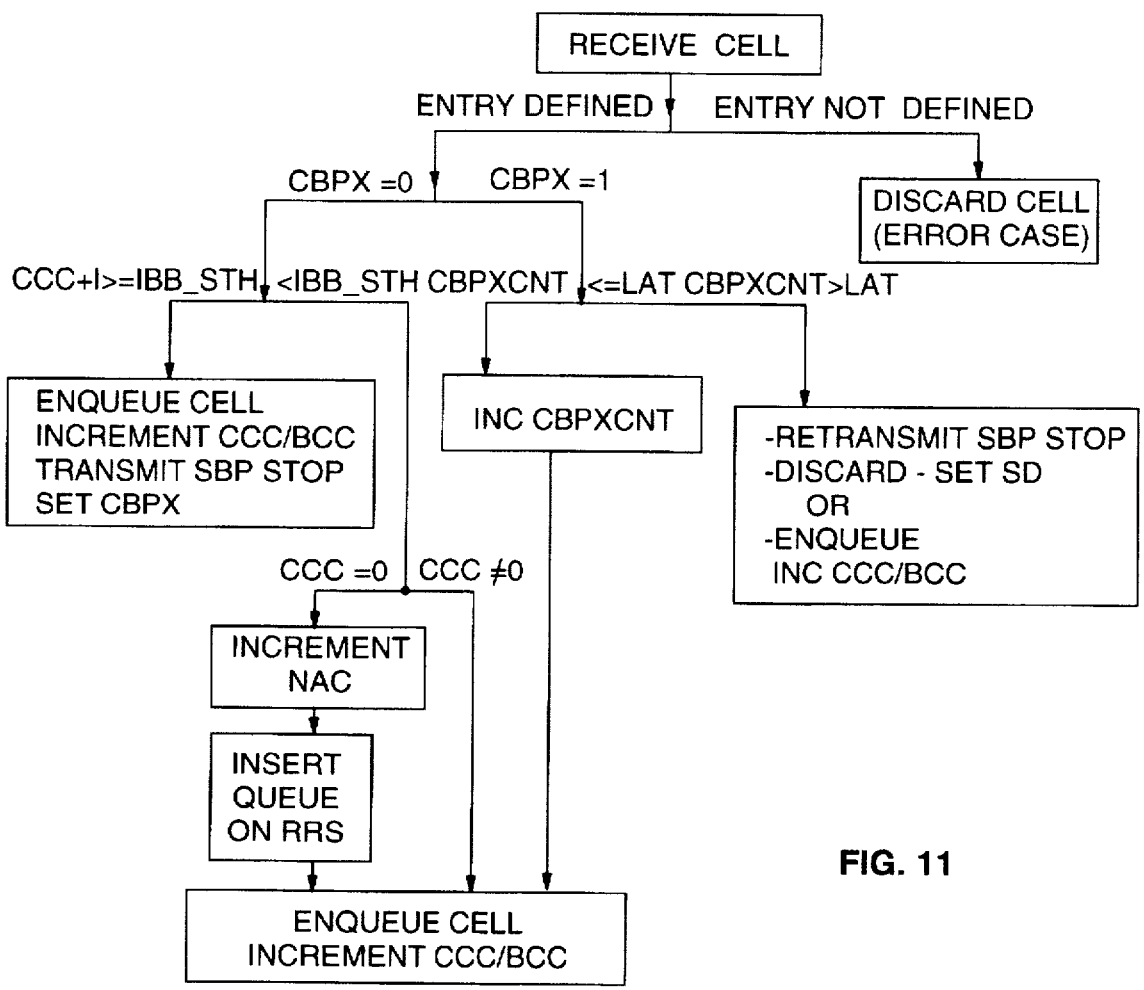
FIG. 11 is a flow diagram of selective stop backpressure generation.
Figure 12:
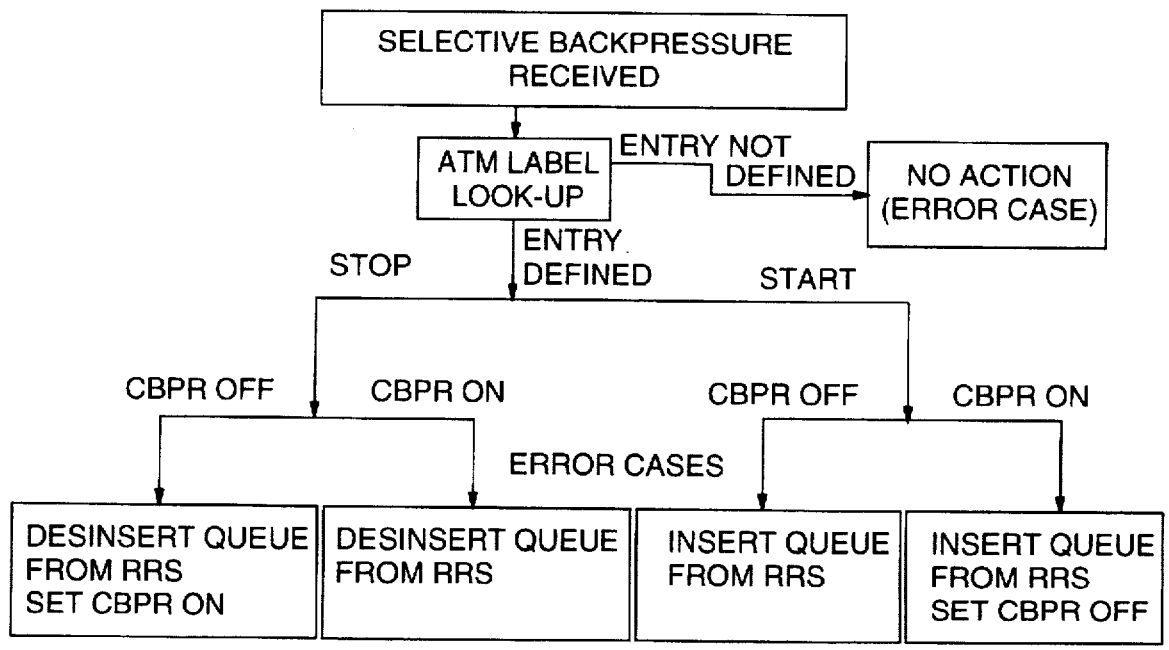
FIG. 12 is a flow diagram of selective stop/start backpressure reception.

FIG. 11 is a flow diagram of selective stop backpressure generation and FIG. 12 is a flow diagram of a selective stop/start backpressure reception. The selective stop handling will now be explained with reference to FIGS. 6 through 9. When a cell is received in the IBB 60 of a node 50 from a connection Ck to queue 610 and the number of cells 611 from queue 610 on port Pi queued in the IBB is equal or greater than IBB_STh 66, the node generates and sends on port Pi a selective backpressure signal 'selective stop connection Ck', assuming a backpressure signal is not already active.

As shown in FIG. 12, the node receiving the selective backpressure signal will discontinue scheduling transfer of cells out of its EBB(Pi) on connection Ck until the node subsequently receives a selective start connection Ck signal. Transmission is halted by removeing the queue from the associated round robin scheduler. The node which sent the backpressure signal sets the connection backpressured transmitted bit CBPX in the connection control block to one, which in turn enables the cell counter of the connection CBPXCNT. All cells received from the backpressured connection will be counted until selective start is sent. In case the counter reaches the maximum allowed value LAT, which is the latency of the link comprising said connection Ck, the selective discard bit SD in the connection control block is set and the backpressure signal is sent again. In the preferred embodiment all cells received from connection Ck after the SD bit is set are discarded.

Figure 13:
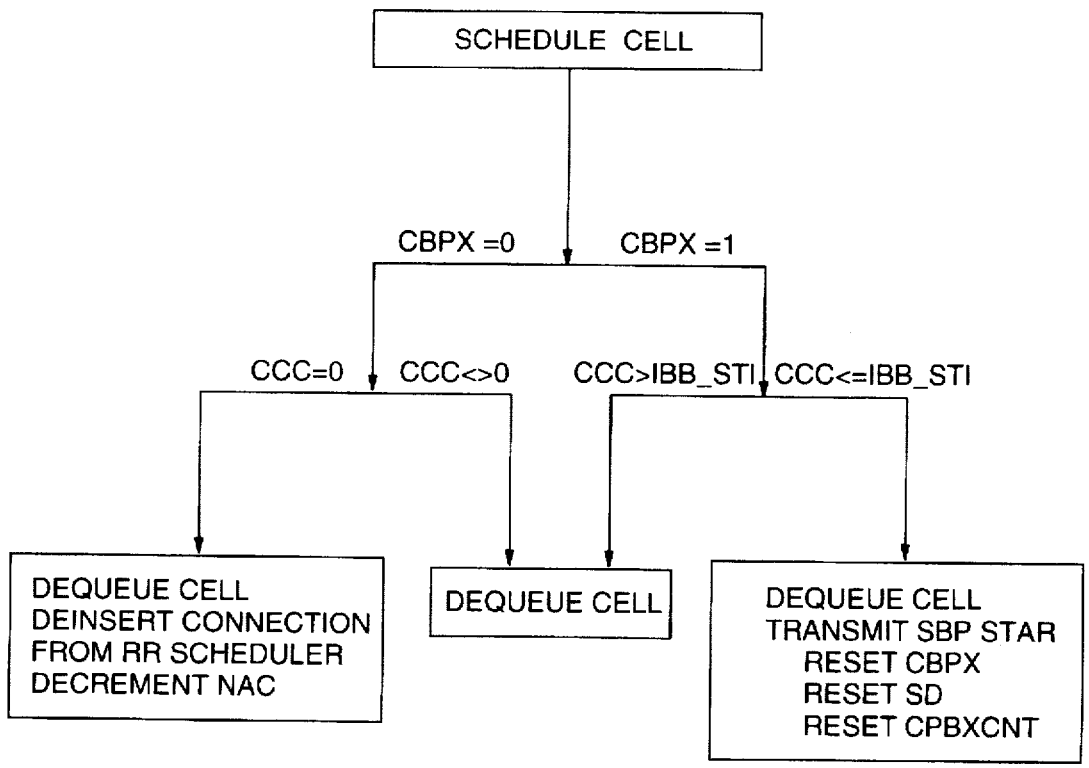
FIG. 13 is a flow diagram of selective start backpressure generation.

FIG. 13 is a flow diagram of a selective start backpressure generation. The global start handling will now be described with reference to FIGS. 6 through 9. When the number of cells from connection Ck on port Pi queued in the IBB is equal or lower than IBB_STl and if the connection Ck is currently selectively backpressured, the node sends a selective backpressure signal to selectively restart connection Ck. The upstream node will resume scheduling cells from connection Ck out of its EBB unless the link comprising connection Ck is subject to a global backpressure condition. The selective restart is accomplished by reinserting the queue of connection Ck into the round robin scheduler. The node which sent the backpressure signal resets the CBPX and SD bits and the CBPXCNT counter of connection Ck to 0.

Figures 14, 15:
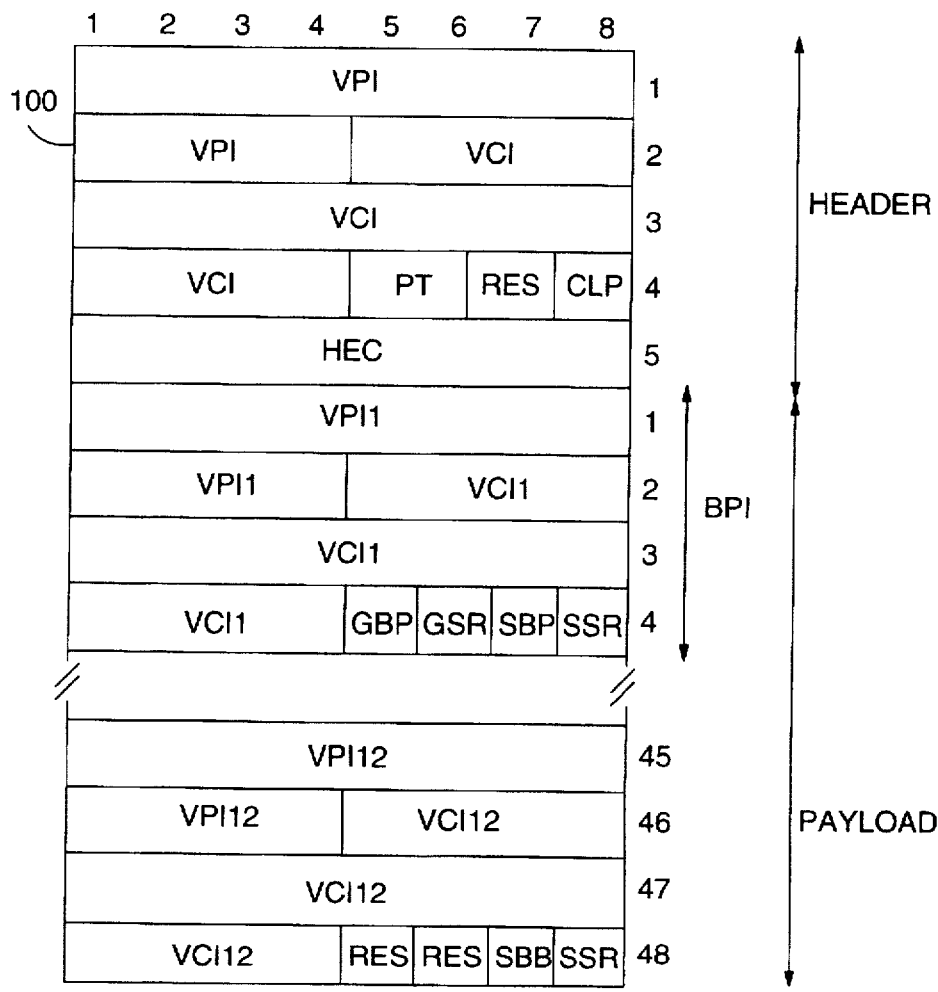
FIG. 14 shows the table of selective thresholds adjustment.
FIG. 15 depicts an ATM flow control cell.

FIG. 14 shows a table of the selective thresholds adjustment. Several constraints need to be taken into account when defining the high and low selective thresholds of a buffer. Values have been chosen so that the offered service is fair, underrun conditions are not enabled and control traffic is as reduced as possible. The fairness issue theoretically requires that the selective threshold high value be the result of the division of the buffer size by the number of active connections (NAC). That can be expressed as: IBB_STh=IBB/NAC Such a theoretical relation is not easy to implement, since the result of this division seldom is an integer. On the contrary the general rule of threshold adjustment described in FIG. 14 is easy to implement and meets all the requirements cited above. Several comments need to be made about the general rule of threshold adjustment.

If the number of active connections is the lowest value in the NAC range value, for example, 5 in the range 5–8, the result obtained by multiplying NAC by IBB_STh is lower than the size of the buffer. This could be interpreted at first sight as bad network resource utilization. However, the unused part of the buffer (IBB−(NAC*IBB_STh)) decreases when the number of active connections increases. As a matter of fact, utilization is 50% in the case of a single active connection, while it is 97% in the case of 31 active connections and 100% when the number of active connections is greater than 32. A second point is that, in the case of few active connections, the high selective threshold is high enough in order to not penalize the connection. For example, if the buffer can store 2048 cells, a single active connection can utilize 1024 cell locations (IBB/2). If the connection traffic fills this area, the upstream connection path is less saturated than the downstream connection path. The role of the node is then to regulate the incoming upstream traffic in order to adapt it to the downstream possibilities. In this view, it is not necessary to authorize the connection to use a large buffer and 1024 storage locations could even appear as a high value. However, this value allows the node to smoothly play its role of upstream rate adaptation. A third point is that the environment in which the proposed scheme operates is highly dynamic and the number of active connections constantly changes. The unused buffer area provided by the threshold adjustment rule leaves free storage for new active connections.

Above thirty-two active connections, the selective threshold high value does not change and remains equal to 64 locations. This could be interpreted at a first sight as a fairness issue. However, decreasing the high selective threshold when the number of active connections increases would lead to very small threshold values. For example if the buffer holds 2048 cells and the number of active connections is equal to 512, application of the fairness definition would result in a high threshold value of four buffers. This would obviously lead to unacceptable overhead in control traffic since the number of queued cells for a given connection would often cross the high or low threshold values. The proposed threshold adjustment rule minimizes control traffic. Moreover, even though the threshold value is not the theoretical one, the buffer is well shared between the active connections. If all the active connections have a number of queued cells equal to the threshold, then there cannot be more than 32 active connections and the queuing is ideal. If the number of active connections is greater, 512 for example, then the number of active connections whose queue is filled at threshold value is necessarily limited. If there are 10 connections at threshold value then the remaining 502 connections have a mean number of queued cells equal to (2048−(10*64))/(512−10)=2.8 cells. Since the 10 connections that have reached the threshold value are selectively stopped, and since the round robin scheduler 68, which out of buffer space, is fair, then the remaining 502 connections will progressively use more buffer space. This will lead the system to its equilibrium which is four buffers per connection which is a perfect share of input best effort buffer.

FIG. 15 is a view of the general format of an ATM flow control cell according to the preferred embodiment of this invention. A private ATM cell is used to convey the backpressure information. The traffic of flow control cells of the best effort service utilizes the reserved bandwidth service and hence benefits from its QOS, low delay and good cell loss ratio. Preferably a control cell is sent no more often than once for every twelve cells sent using the reserved bandwidth service. Hence, the reserved bandwidth allocated to best effort flow control traffic is 8% of the link bandwidth. When the twelfth cell slot occurs, if there is a backpressure information to send, then a control cell is transmitted even if there are waiting cells in the reserved bandwidth service queue. If there is no control information to send, the twelfth cell slot is used to transmit a cell of the reserved bandwidth service, or if the reserved bandwidth service queue is empty, to send a cell of the best effort service.

The flow control cell is identified by a dedicated connection identifier: VPI (Virtual Path Identifier) and VCI (Virtual Channel Identifier) and a dedicated PT1 (Payload Type Identifier) type, PTI=110. The cell loss priority bit CLP is set to 0. The HEC field (Header Error Control) is used for correction of bit errors in the cell header. The cell payload contains all the backpressure signal information. In the case of a selective backpressure signal, the information conveyed is the Virtual Channel Identifier (VPI-VCI) of the connection affected by the backpressure signal along with the backpressure command (selective stop or start). In the preferred embodiment of this invention, the information is defined in a four byte field in the cell payload, called hereafter a pressure slot. In this field, the VPI-VCI is located just like a regular VPI-VCI in the header of an ATM cell. The GBP bit indicates whether the cell contains global backpressure information and the SBP bit indicates whether the pressure slot contains selective backpressure information. The GSR bit and SSR bit indicate, respectively, whether the global information or selective information, is a start or a stop command.

The private cell can transport twelve backpressure slots in the 48 byte payload. This allows one flow control cell to carry from one to twelve selective backpressure signals and hence this implementation reduces the bandwidth required by the flow control traffic versus a one-for-one implementation. In addition, the implementation speeds up the transmission of the backpressure signals. If less than twelve backpressure signals are to be sent, they will be loaded into the control cell in contiguous backpressure slots starting from the first one. In case of a global backpressure signal, the information to be conveyed is the stop or start command. In the preferred embodiment of this invention, the global stop/start backpressure command is encoded with two bits in the first backpressure slot of the private cell.

What is claimed is:

1. For use in a data communication system having a plurality of nodes interconnected by links, each of said links being able to support one or more logical connections between adjacent nodes, each of said connections supporting a separate flow of data cells from a source node to a connection-specific input buffer at a destination node, a data traffic flow control system located in the destination node and comprising:

a first backpressure mechanism for monitoring the number of data cells received in a connection-specific input buffer for each logical connection to the destination node and for generating a connection-specific backpressure signal for a connection on which the number of data cells stored in the connection-specific input buffer exceeds a predetermined connection-specific high threshold level; and a second backpressure mechanism for monitoring the number of data cells received in the connection-specific input buffers for all of the logical connections on a particular link to the destination node and for generating a global backpressure signal for the particular link if the total number of data cells received on the link exceeds a predetermined global high threshold level.

2. A data traffic flow control system according to claim 1 further including means for forwarding any connection-specific or global backpressure signals to the source node for the purpose of causing to cause said node to stop sending data traffic on specific connections for connection-specific backpressure signals or on all connections for a global backpressure signal.

3. A data traffic flow control system according to claim 2 wherein the number of available storage locations in a connection-specific buffer buffer exceeds the number of data cells in the high global threshold in order to accommodate data cells transmitted after a backpressure signal is generated at the destination node.

4. A data traffic flow control system according to claim 3 wherein said first backpressure mechanism further includes means for generating a selective restart signal where the number of cells stored in the connection-specific input buffer for a specific connection falls below a connection-specific low threshold level; and said second backpressure mechanism further includes means for generating a global restart signal where the total number of cells stored in all of the connection-specific input buffers falls below a global low threshold level.

5. A data traffic flow control system according to any of claims 2 through 4 wherein the backpressure signals are given priority over data cells in data flows between nodes.

6. For use in a data communication system having a plurality of nodes interconnected by links, each of said links being able to support one or more logical connections between adjacent nodes and each of said connections supporting a separate flow of data cells from a source node to a connection-specific input buffer at a destination node, a flow control method comprising the steps of:

monitoring the number of data cells stored at any given time in each of the connection-specific buffers at the destination node;

generating a connection-specific backpressure signal for forwarding to the source node for each connection for which the number of stored cells exceeds a predetermined connection-specific threshold level; and generating a global backpressure signal for forwarding to the source node if the total number of stored cells for all connections from the source node exceeds a predetermined global threshold level.

7. A method as set forth in claim 6 including the additional steps of forwarding a connection-specific backpressure signal to the source node to allow the source node to stop sending data cells to the destination node over the connection identified in the backpressure signal and forwarding a global backpressure signal to the source node to allow the source node to step sending data cells on all connections between the source node and the destination node.

8. A method as set forth in claim 7 comprising the additional steps of:

generating a connection-specific restart signal for each connection for which the number of stored cells falls below a predetermined low connection-specific threshold; and forwarding the connection-specific restart signal to the source node for the connection only if there is no existing global backpressure signal for the source node.

9. A method as set forth in claim 8 comprising the additional steps of:

generating a global restart signal for a given link when the total number of stored cells received over the link falls below a predetermined low global threshold; and forwarding the global restart signal to the source node for the link.

* * * * *